United States Patent [19]

Wuetig

[11] 3,924,720
[45] Dec. 9, 1975

[54] INDEXING TABLE ADVANCE MECHANISM
[75] Inventor: Ralph T. Wuetig, Dolton, Ill.
[73] Assignee: Signode Corporation, Glenview, Ill.
[22] Filed: July 12, 1974
[21] Appl. No.: 488,246

[52] U.S. Cl. .................................................. 197/6.5
[51] Int. Cl.² ............................................ B41J 1/22
[58] Field of Search ................ 197/6.4, 6.5, 6.6, 47, 197/55, 82, 85, 87; 101/93.24, 93.25; 74/1.5

[56] References Cited
UNITED STATES PATENTS

| | | | |
|---|---|---|---|
| 2,664,985 | 1/1954 | Schacht | 197/6.5 |
| 3,236,352 | 2/1966 | Schacht | 197/6.6 |
| 3,645,373 | 2/1972 | Allen | 197/82 |
| 3,726,380 | 4/1973 | Beers et al. | 197/6.6 |
| 3,785,470 | 1/1974 | Schacht | 197/6.4 |
| 3,842,957 | 10/1974 | Wilkin et al. | 197/6.4 |

Primary Examiner—Wm. H. Grieb
Attorney, Agent, or Firm—Dressler, Goldsmith, Clement & Gordon, Ltd.

[57] ABSTRACT

An indexing table positioning a workpiece to be imprinted with desired markings for access by a stamping means such as a marking dial or a similar imprinting or embossing device is provided with an advance mechanism which includes a solenoid-actuated cam means having a pair of spaced, parallel detent faces which alternately engage a tooth on an escapement wheel. The indexing table is subjected to a substantially constand pull from a negator spring and urges the escapement wheel in an abutting relationship with one of the detent faces. Actuation of the cam means permits advancement of the indexing table for a predetermined distance in response to the pull of the negator spring.

7 Claims, 11 Drawing Figures

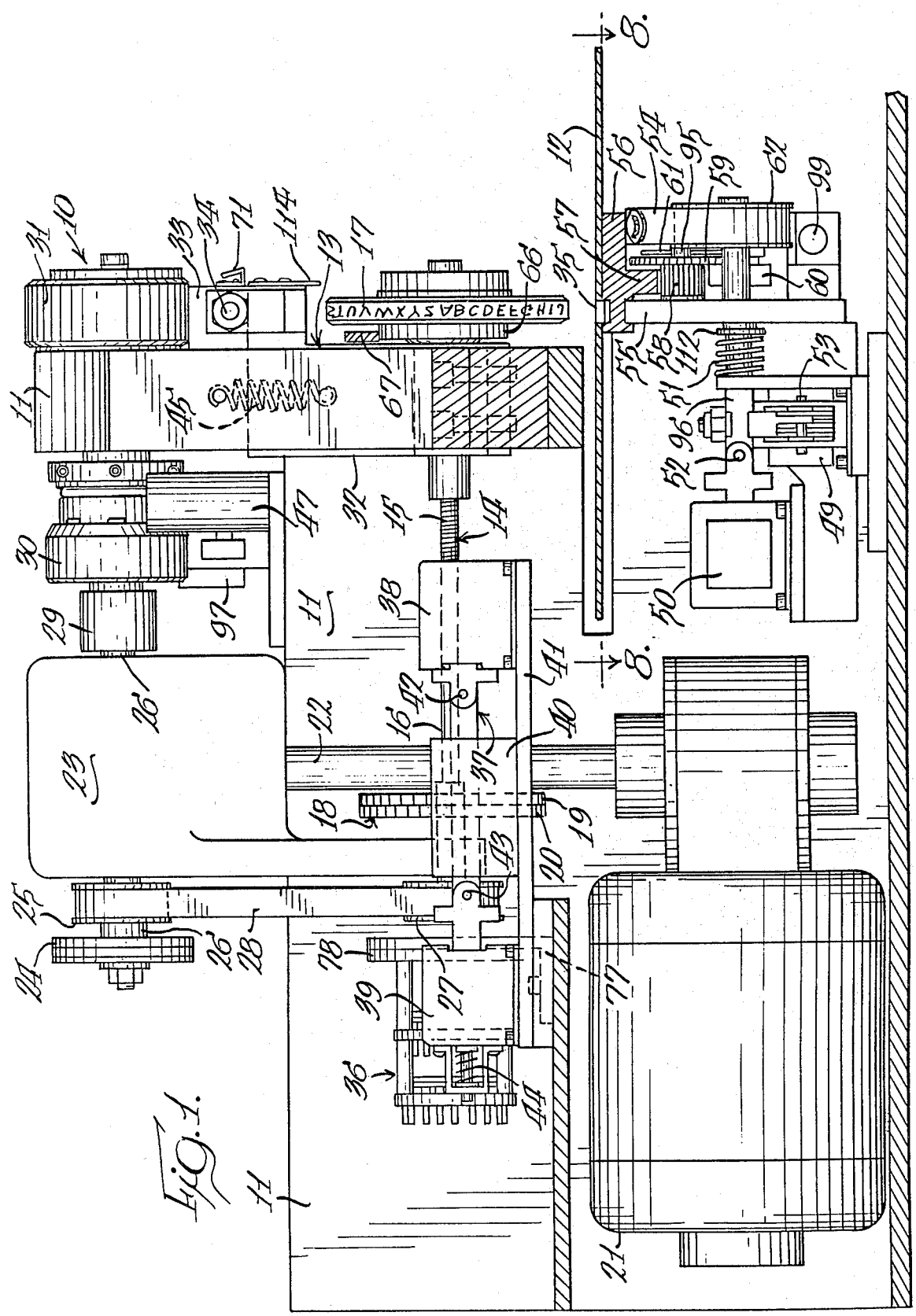

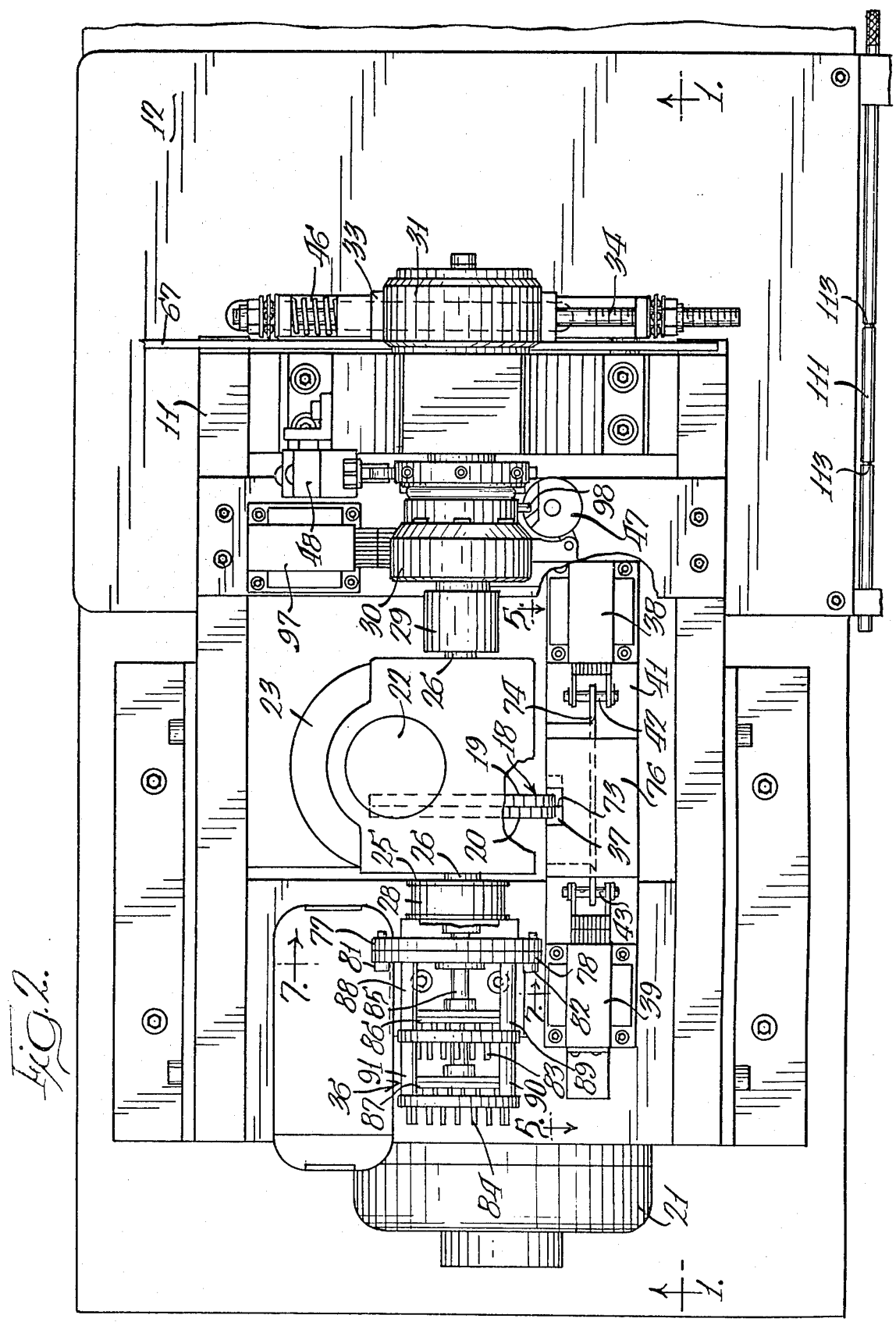

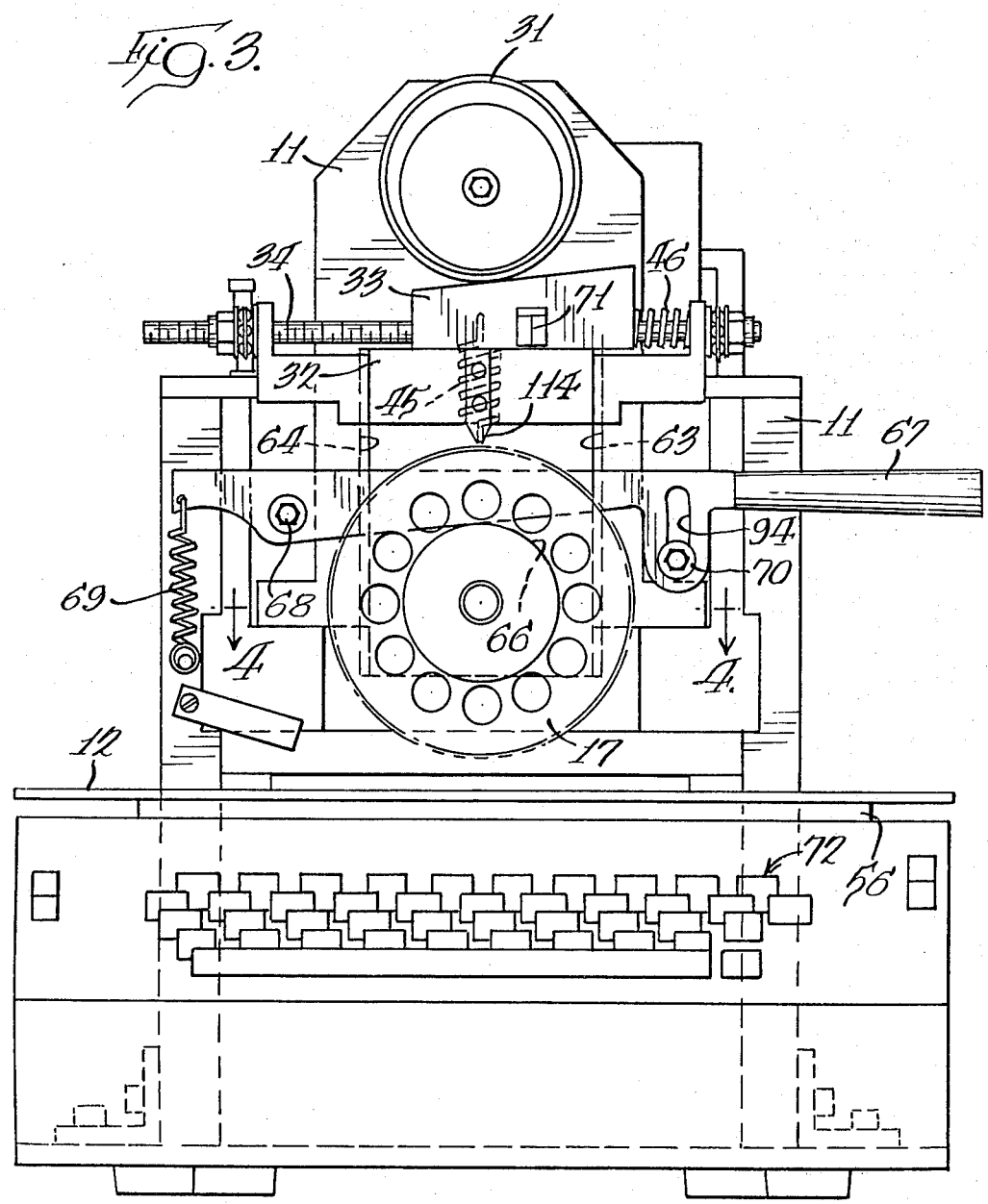

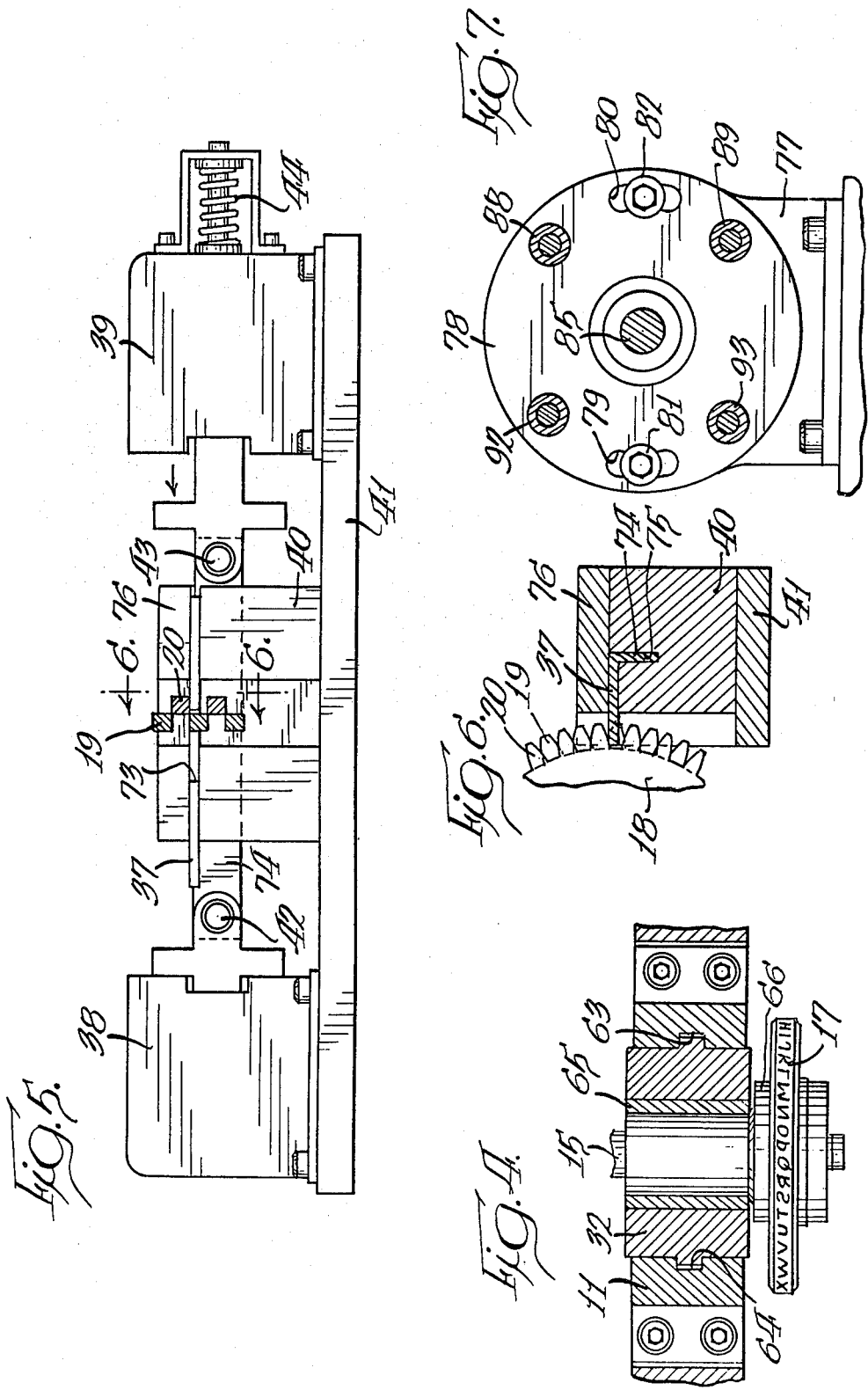

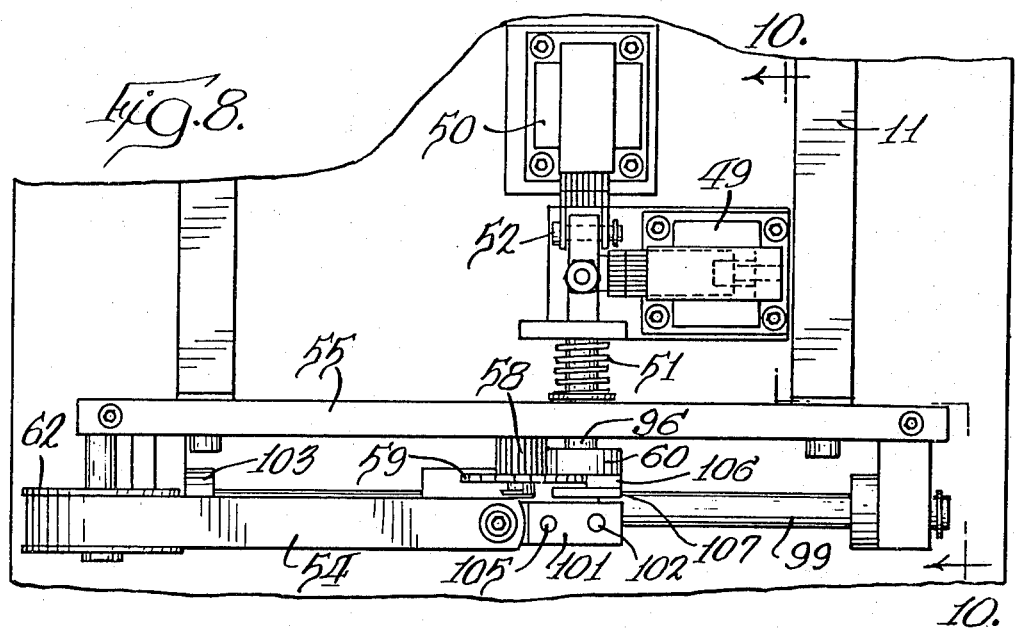
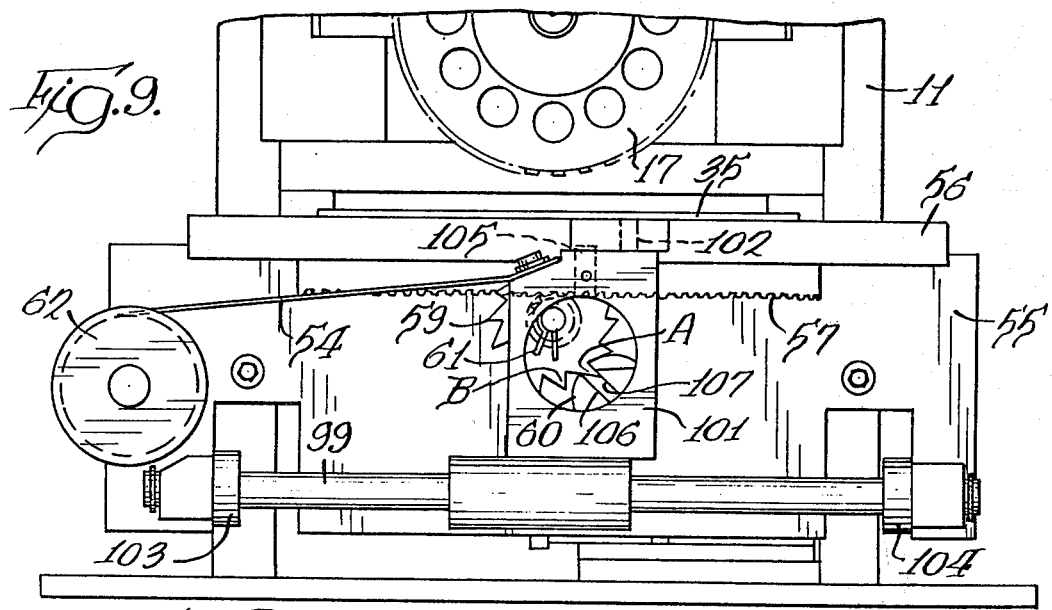
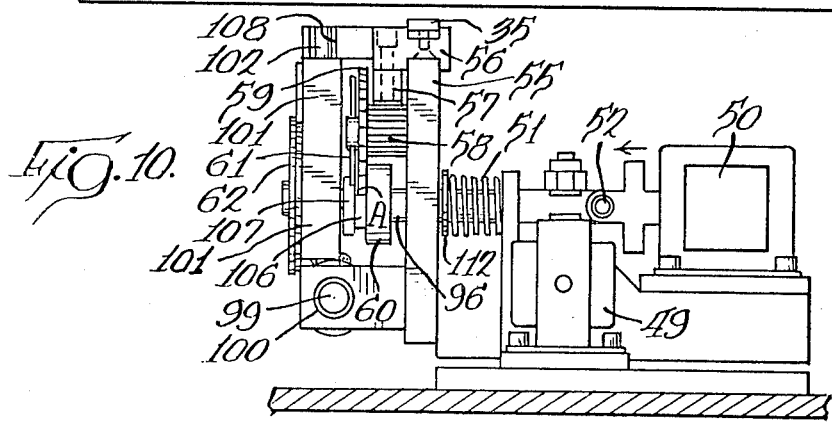

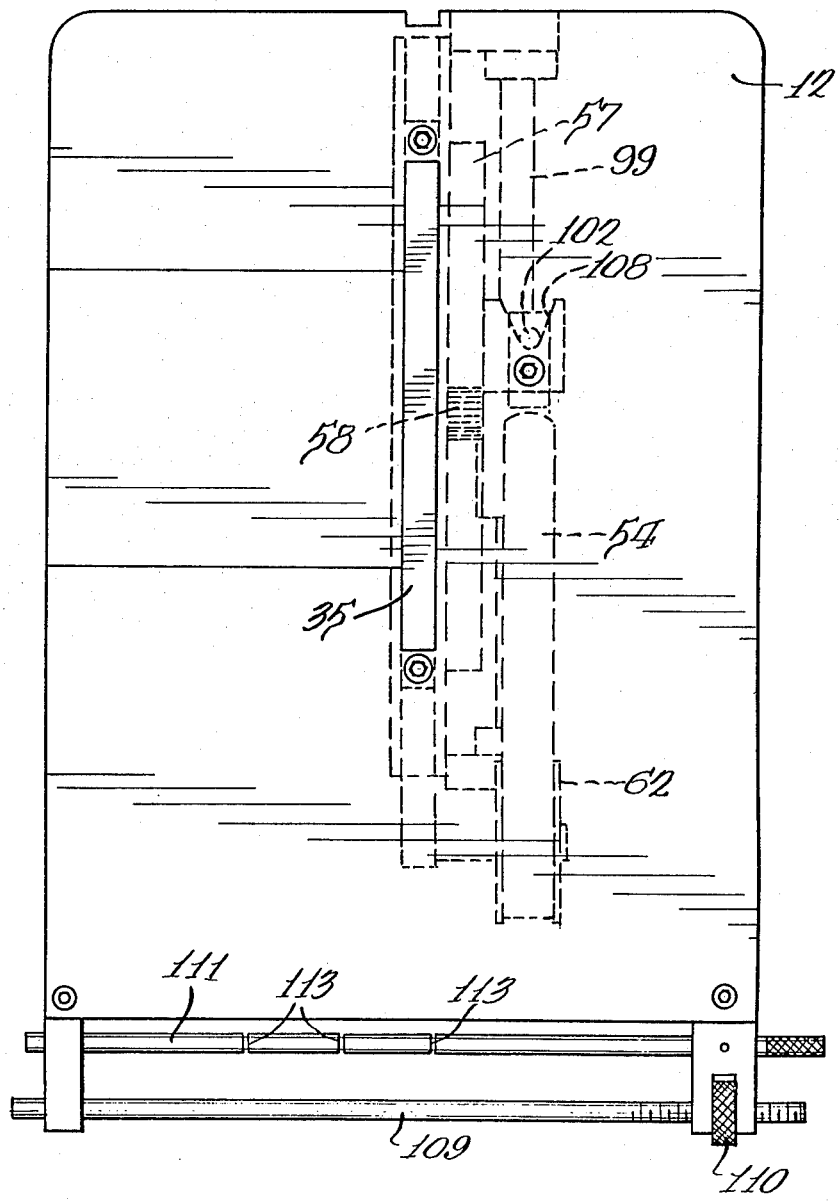

INDEXING TABLE ADVANCE MECHANISM

BACKGROUND OF THE INVENTION

This invention relates to devices for supporting and incrementally advancing workpieces. In one aspect, this invention relates to indexing tables for electrically actuated name-plate markers.

Indexing tables of this general type provide a support table to hold and position a nameplate or similar workpiece and an advance mechanism to incrementally advance the workpiece after work has been performed thereon. In case of nameplate marking, imprinting is effected using a stamping means such as a marking dial provided with the desired characters which contact the workpiece while it is held on the indexing table. After each marking stroke the indexing table is advanced a predetermined distance to position the workpiece for the next marking stroke.

For quality imprinting at relatively high speed it is important that positive and reproducible indexing of the support table is obtained when the marking machine is in operation. Moreover, the closer the spacing desired between consecutive markings on the workpiece, the more critical becomes the indexing problem.

It is an object of the present invention to provide an improved indexing table advance means for substantially uniform indexing of the workpiece along the entire path of travel for the indexing table. A further object of this invention is to provide an advance mechanism which is reliable and relatively trouble-free in operation. Still other objects of this invention will become apparent upon reference to the ensuing specification, the accompanying drawings, and the claims.

SUMMARY OF THE INVENTION

The present invention contemplates an indexing table advance means which utilizes a solenoid-actuated cam to control the movement of an escapement wheel having an integral pinion which engages a rack carried by an indexing table. The indexing table advance means comprises a slide means for supporting the indexing table slidably positioned on a frame and provided with a rack means, pinion means rotatably mounted on the frame and engaging the rack means, escapement wheel means integral with the pinion means, cam means having a pair of spaced, substantially parallel detent faces for alternate engagement with a tooth on the escapement wheel means, spacing solenoid means linked to the cam means for axially shifting the cam means so as to engage alternate detent faces with a tooth on the escapement wheel, release solenoid means linked to the cam means for pivoting the cam means so as to move both of the detent faces out of engagement with the escapement wheel, and negator spring means mounted on the frame and associated with the slide means so as to apply a substantially constant pull on the slide means and to urge a tooth on the escapement wheel against one of the detent faces.

The advance means is operated by energizing the spacing solenoid so as to shift a first detent face which engages a tooth on the escapement wheel out of engagement therewith and to present a second detent face for engagement with the next consecutive tooth on the escapement wheel. When the spacing solenoid is subsequently deenergized, the second detent face is shifted out of engagement with said next consecutive tooth and this tooth engages the first detent face. As a result, the tooth initially engaging the escapement cam means passes the cam means, and coaction of the pinion means with the rack means advances the indexing table a predetermined distance by the action of the negator spring. When the release solenoid is energized, the escapement cam means is pivoted so that the escapement wheel clears both detent faces, and the indexing table can be moved laterally as desired, either in the direction of pull by the negator spring or manually against the pull of the negator spring.

BRIEF DESCRIPTION OF THE DRAWINGS

In the drawings,

FIG. 1 is a fragmentary side elevational view, partly in section, of an electric nameplate marking machine embodying the present invention and taken along plane 1—1 in FIG. 2, outer housing having been removed to show details of the construction;

FIG. 2 is a plan view of the marking machine shown in FIG. 1;

FIG. 3 is an end elevational view of the marking machine shown in FIG. 1;

FIG. 4 is a fragmentary sectional view taken along plane 4—4 in FIG. 3;

FIG. 5 is an enlarged elevational view, partly in section, taken along plane 5—5 in FIG. 2;

FIG. 6 is a sectional elevation taken along plane 6—6 in FIG. 5;

FIG. 7 is an enlarged elevational view taken along plane 7—7 in FIG. 2;

FIG. 8 is a fragmentary plan view taken along plane 8—8 in FIG. 1 with the indexing table removed;

FIG. 9 is a fragmentary end elevational view similar to FIG. 3 with the keyboard removed to show interior detail;

FIG. 10 is an elevational view taken along plane 10—10 in FIG. 8; and

FIG. 11 is a plan view of the indexing table used with a marking machine of this invention.

DESCRIPTION OF THE PREFERRED EMBODIMENTS

Referring to FIG. 1, marking machine 10 comprises frame 11, indexing table 12 slidably mounted in frame 11, and marking ram 13 mounted in frame 11 above indexing table 12 and carrying marking dial 17.

The actual imprinting of a workpiece takes place on a downward stroke of marking ram 13 which causes marking dial 17 to contact the workpiece. Marking ram 13 is actuated by cam 31 journaled in frame 11 and is driven by electric motor 21. The drive train for marking ram 13 includes interconnecting shaft 22 which is connected at right angles with the motor output shaft and provides power input into transmission 23. Output shaft 26 from transmission 23 is connected by means of coupling 29 and through single-revolution clutch 30 to eccentric cam 31. Clutch 30 is provided with peripheral stop pin 98 (FIG. 2) which abuts cam block 47 pivotally mounted on frame 11 and actuatable to release stop pin 98 by means of clutch solenoid 97. Limit switch 48 is operably connected to energize spacing solenoid 50 at a point in time when marking ram 13 is moving upwardly.

Marking ram 13 comprises slide block 32 slidably mounted in slideways 63 and 64 (FIG. 4) provided for that purpose in frame 11, return spring 45 connected to slide block 32 and frame 11, and also wedge block 33 which contacts the working surface of cam 31. Wedge block 33 is slidably mounted on slide block 32 and serves to adjust the stroke of marking ram 13 when cam 31 is actuated. The stroke of marking ram 13 can be adjusted by turning depth adjustment screw 34 which engages and positions wedge block 33 in contact with the surface of cam 31 and against the urging of bias spring 46. The depth adjustment, of course, also determines the depth of the marking imprint. Rotatable marking dial 17 carried by marking ram 13 is mounted thereon by means of an indexing shaft in a manner which will be described in detail hereinbelow.

The indexing assembly for marking dial 17 is also driven by electric motor 21 and includes indexing shaft 14 which carries marking dial 17 and also double ratchet gear 18 keyed to shaft 14. For actuating the indexing assembly, output shaft 26 is provided with pulley 25 which is driven through slip clutch 24 mounted on terminal portion of output shaft 26. Transmission belt 28 on pulley 25 drives pulley 27 mounted on indexing shaft 14 which, in turn, drives marking dial 17. Indexing shaft 14 comprises interconnected flexible portion 15 and rigid portion 16. Marking dial 17 is mounted at the distal end of flexible portion 15 and is journaled in slide block 32 by means of bearing 65 (FIG. 4). The relatively easy accessibility to marking dial 17 permits easy interchangeability thereof, when desired. Double ratchet gear 18 is fixedly mounted on rigid portion 16 of shaft 14 and rotates therewith. The distal end of rigid portion 16 carries rotary switch means 36 having rotary switch arm 85 connected to indexing shaft 14 (FIG. 2).

Double ratchet gear 18 is provided with a pair of substantially parallel rows 19 and 20 of equally spaced gear teeth which determine the possible indexing positions for dial 17. As shown in FIGS. 1, 2 and 6, the gear teeth in rows 19 and 20 are disposed relative to each other so that one row of gear teeth is out of phase relative to the other row of gear teeth by about one-half the distance between consecutive gear teeth in each row. Preferably, the tooth form of the gear teeth is such that line contact is provided with detent plate 37 when detent plate 37 is shifted into engagement therewith. In other words, the pitch line for gear teeth in rows 19 or 20 is normal to the contact surface of detent plate 37. Single detent plate 37 is positioned for engagement with double ratchet gear 18 and receives teeth rows 19 and 20 in notch 73 when in a neutral position. In a working position as shown in FIG. 2, detent plate 37 is illustrated engaging gear tooth row 20.

For indexing marking dial 17 detent plate 37 is moved into engagement with double ratchet gear 18 by means of solenoids 38 and 39 which are individually linked to detent plate 37 by means of clevis pins 42 and 43, respectively. In a preferred embodiment, detent plate 37 is provided with a longitudinal flange such as flange 74 which is received in a longitudinally extending notch 75 in detent plate support block 40 (FIG. 6). Support block 40 is, in turn, mounted on detent base plate 41 which is secured to frame 11 in any convenient manner. Return spring 44 serves to position notch 73 in detent plate 37 so as to receive ratchet gear 18 therein. Thus, when one of solenoids 38 or 39 is energized, detent plate 37 can be shifted laterally so as to engage a gear tooth either in row 19 or in row 20, as can be readily seen from FIG. 5. Preferably, detent cover plate 76 is secured to support block 40 and is substantially coextensive with detent plate 37.

Solenoids 38 and 39 are energized by rotary switch means 36 at the rear end of marking machine 10 which comprises rotary switch arm 85 carrying front deck wiper contact 86 and rear deck wiper contact 87 which slidably engage respective front deck switch contacts 83 and rear deck switch contacts 84 when switch arm 85 is rotated. Switch contacts 83 and 84 are positioned in sliding contact with wiper contacts 86 and 87 by means of spacer bars such as bars 88, 89, 90, 91, 92 and 93. Spacer bars 88, 89, 92 and 93 are mounted on rotary switch cover plate 78 which in turn is mounted on rotary switch mounting bracket 77. Arcuate slots 79 and 80 are provided near the periphery of cover plate 78 and receive therein retaining screws 81 and 82, respectively, which screws engage mounting bracket 77 and hold cover plate 78 thereagainst. In this manner the position of switch contacts 83 and 84 can be readily adjusted relative to wiper contacts 86 and 87 by partially loosening retaining screws 81 and 82 and turning switch contacts 83 and 84 in a clockwise or counterclockwise direction as required without disassembling rotary switch 36.

The energization of solenoids 38 and 39 is effected by means of alphanumeric keyboard 72 (FIG. 3), the individual keys of which are each connected to a contact on the rotary switch 36. Preferably, keys for alternate characters are connected to the same deck. Thus, when a key on keyboard 72 closes a circuit with its associated contact on deck 83 or deck 84, the corresponding wiper contacts such as contacts 86 or 87 on rotary arm 85, upon reaching the associated switch contact, close a circuit to one of the detent solenoids 38 or 39. The energized solenoid then pulls detent plate 37 into double ratchet gear means 18 from one side or the other, thereby stopping gear 18 in a position which locates the desired character on marking dial 17 in a position immediately above a nameplate to be marked.

A manual actuating means for marking ram 13 is illustrated in FIG. 3 and aids in the initial positioning of a workpiece for marking. The manual actuating means comprises hub 66 provided on the rearward face of marking dial 17 and manual pushdown lever 67 pivotally mounted on frame 11 by means of mounting screw 68. Pushdown lever 67 is held in position by return spring 69. If desired, a suitable guide slot 94 can be provided integral with pushdown lever 67 and guide pin 70 provided on frame 11 for engaging slot 94. When pushdown lever 67 is moved downwardly so as to engage hub 66, further downward movement of lever 67 will cause slide block 32 to move downwardly until such time as marking dial 17 abuts against a nameplate positioned therebelow. In this manner the actual point of contact between marking dial 17 and a suitable nameplate can be readily ascertained before actual marking is commenced. Upon removal of manual force on lever 67, slide block 32 returns to its rest position by the action of slide block return spring 45. Pointer 71 on wedge block 33 serves to indicate the depth of the marking ram stroke and can be appropriately calibrated by providing suitable markings on frame 11 or marking machine housing, as desired. Dial alignment indicator 114 can also be provided, mounted on slide block 32, to facilitate the alignment of marking dial 17 during installation of when such dials are interchanged to provide different sizes or styles of marking characters.

A nameplate to be marked is positioned on indexing table 12 over anvil 35 and is suitably clamped or otherwise positioned thereon so that the nameplate advances when indexing table 12 is advanced by the pulling action of negator spring 54 associated therewith. The mechanism for advancing indexing table 12 comprises negator spring 54, escapement wheel 59, and escapement cam 60 (FIG. 1) which detains escapement wheel 59 against the pull of negator spring 54. Cam 60 is mounted on one end of elongated escapement cam shaft 96 and engaging escapement wheel 59 which is provided with integral pinion 58 and journaled on shaft 95 fixed to frame 11. Escapement wheel 59 and pinion 58 are held in place on shaft 95 by retaining clip 61. Escapement cam shaft 96 is slidably and rotatably mounted in frame 11. Slide support 55 mounted on frame 11 carries anvil slide 56 provided on the underside thereof with rack 57 which engages pinion 58. The free end of negator spring 54 wound on drum 62 is connected to carriage 101 (FIG. 8), and anvil slide pin 102 on carriage 101 engages pickup notch 108 in anvil slide 56 (FIGS. 9, 10 and 11) thereby subjecting anvil slide 56 to the pull of negator spring 54 which provides a substantially constant pull against the aforesaid escapement mechanism.

Carriage 101 partially supports indexing table 12 and is slidably mounted on carriage shaft 99 (FIGS. 8 and 9) which, in turn, is mounted on and traverses across the forward end of frame 11 parallel to the normal movement of indexing table 12. Shaft 99 is secured in bushings such as bushing 100 (FIG. 10). Carriage stops 103 and 104 on the terminal portions of shaft 99 limit the travel of carriage 101 and thus the movement of anvil slide 56 and indexing table 12. That portion of anvil slide 56 overlying carriage 101 bears on alignment bushing 105 situated in a recess in carriage 101 near anvil slide pin 102.

To permit incremental advance of indexing table 12, cam 60 is provided with a pair of spaced, parallel detent faces 106 and 107 which are positioned to consecutively engage a tooth on escapement wheel 59 as shown in FIG. 9 where tooth A engages detent face 107. Detent faces 106 and 107 are parallel to the longitudinal axis of escapement cam shaft 96. Spacing solenoid 50 is linked to escapement cam shaft 96 by means of clevis pin 52, and thus to cam 60, and is spring biased in the forward direction when deenergized so that an axial forward movement of shaft 96 by the action of escapement cam spring 51 abutting retainer ring 112 on shaft 96 shifts detent face 107 out of engagement with tooth A and permits tooth B to engage detent face 106. Subsequent retraction of shaft 96 when solenoid 50 is energized withdraws detent faces 106 from engagement with tooth B and permits tooth B to abut against detent face 107. In this manner, the energization and subsequent deenergization of spacing solenoid 50 permits indexing table 12 to advance one space, in response to urging by negator spring 54, after a character has been imprinted on a nameplate or similar workpiece carried thereon or when a spacer bar has been depressed and released on keyboard 72 energizing and deenergizing spacer solenoid 50.

Release of indexing table 12 so as to permit bilateral movement for positioning a nameplate under marking dial 17 is effected by release solenoid 49 which is connected to escapement cam shaft 96 so as to pivot cam 60 counterclockwise and detent faces 106 and 107 clear of escapement wheel 59, thereby permitting uninterrupted travel of carriage 101 from one extreme position to the other while release solenoid 49 remains energized. Sufficient play is provided in the connection between spacing solenoid 50 and shaft 96 so that no excessive stresses are placed on the connection when shaft 96 is pivoted by release solenoid 49.

If desired, indexing table 12 can be provided with a suitable workpiece locator gauge mounted on locator gauge lock rod 109 situated along one side of table 12. Lock rod 109 can also be provided with fine adjustment screw 110 for making fine positioning adjustments once the locator gauge engages lock rod 109. Where rows of markings are to be made at a predetermined spacing from each other, spacing rod 111 can be mounted alongside lock rod 109 and provided with reference markings 113 thereon.

In operation of the marker machine embodying this invention, once the marker is turned on by energizing motor 21, output shaft 26 turns continuously. Similarly, indexing shaft 14 is driven continuously by transmission belt 28 which drives pulley 27 keyed to indexing shaft 14. Because of the action of slip clutch 24, the rotation of double ratchet gear 18 and rotary switch 36 can be stopped without interfering with the rotation of output shaft 26.

The forward end of rotating output shaft 26 drives single revolution clutch 30 through coupling 29. Cam 31 is actuated for one revolution at a time by clutch 30, and rotation of cam 31 causes slide block 32 to move substantially vertically down and up through a predetermined stroke, usually about 3/16 inch, so as to bring marking dial 17 into contact with a workpiece to be marked.

Marking dial 17 is rotated by indexing shaft 14 through flexible portion 15 thereof which accommodates the stroke of marking ram 13. Rotation of marking dial 17 stops when rotation of indexing shaft 14 is stopped by stopping double ratchet gear 18, i.e., when detent plate 37 is caused to engage gear 18 by energizing one of the detent solenoids.

When a desired marking is to be impressed onto a workpiece carried on indexing table 12, the desired key is depressed on keyboard 72 and detent plate 37 is shifted into position engaging a predetermined tooth in either row 19 or row 20, depending on which character on marking dial 17 has been selected for imprinting by depressing a key on alphanumeric keyboard 72. When each row of teeth on gear 18 contains 20 teeth, the spacing between consecutive teeth of both rows permits double ratchet gear 18 to be stopped in any one of 40 equally spaced positions. Each such position corresponds to the position of one of 40 characters provided on marking dial 17. Thus the stopping of double ratchet gear 18 stops marking dial 17 in a position to mark a character.

Single revolution clutch 30 is actuated when clutch solenoid 97 is energized and retracts, partially rotating cam block 47 to release stop pin 98 on clutch 30. By providing positive engagement of cam block 47 with stop pin 98, successive strokes of marking ram 13, and thus of dial 17, can take place only by reenergization of clutch solenoid 97.

When lettering dial 17 descends, the character at the bottom of dial 17 is impressed into the workpiece which is carried on indexing table 12 and supported by anvil 35. Rack 57, which engages escapement pinion 58, links anvil 35 with escapement wheel 59. Negator spring 54 provides a constant pull to move anvil 35 to the left; however, such motion is restrained by escapement cam 60 a detent face of which engages a tooth on escapement wheel 59. The energization of spacing solenoid 50 permits one tooth of escapement wheel 59 to pass cam 60 at a given time, thereby permitting indexing table 12 to shift one space to the left. Spacing solenoid 50 is energized by limit switch 48 at a predetermined position of cam 31 at the end of each marking cycle, thus, as soon as an imprint has been made, indexing table 12 is moved to a new position.

When a key is depressed on keyboard 72, the key closes a circuit to its associated contact on deck 83 or deck 84 of rotary switch 36. When a corresponding wiper contact 86 or 87 carried by switch arm 85 reaches that contact, a circuit is closed to either detent solenoid 38 or to detent solenoid 39 which then pulls detent plate 37 from its neutral position into engagement with a tooth in row 19 or row 20 on gear 18. At the same time the wiper contact also closes a circuit to a suitable delay network (not shown) which releases single revolution clutch 30 by energizing clutch solenoid 97 and locks in the energized detent solenoid 38 or 39 so that the marking cycle will be completed even if the initially depressed key is released before completion of the marking cycle.

As clutch 30 turns, slide block 32 is depressed against the action of slide block return spring 45 by the movement of eccentric cam 31 to make the imprint and then returned to an upper rest position. As clutch 30 continues to turn, solenoid 50 is pulsed, thereby moving indexing table 12 one space further to the left as described hereinabove, clutch solenoid 97 is released causing stop pin 98 to abut cam block 47, and the energized detent solenoid is also released if the keyboard key has been released at this time. If the keyboard key is still depressed at this time, the detent solenoid remains energized until the key is ultimately released. Thereafter the marker is ready to execute the next marking cycle.

The foregoing specification and the drawings are intended as illustrative and are not to be taken as limiting. Still other variations and rearrangements of parts within the spirit and scope of this invention are possible and will readily present themselves to one skilled in the art.

I claim:

1. An indexing table advance means which comprises a frame; slide means on said frame and supporting an indexing table; rack means mounted on said slide means; pinion means rotatably mounted on said frame and engaging said rack means; escapement wheel means integral with said pinion means; cam means having a pair of spaced substantially parallel detent faces positioned for alternate engagement with a tooth on said escapement wheel means; spacing solenoid means linked to said cam means for axially shifting said cam means so as to alternately engage said detent faces with a tooth on said escapement wheel; release solenoid means linked to said cam means for pivoting said cam means so as to move both of said detent faces out of engagement with said escapement wheel; and negator spring means mounted on said frame and associated with said slide means for applying a substantially constant pull on said slide means and urging a tooth on said escapement wheel against one of said detent faces.

2. The indexing table advance means in accordance with claim 1 wherein said cam means is attached to an elongated shaft slidably and rotatably mounted in said frame and wherein said spacing solenoid means is connected to said elongated shaft.

3. The indexing table advance means in accordance with claim 2 wherein said spacing solenoid is spring-biased in the forward direction when deenergized.

4. The indexing table advance means in accordance with claim 1 wherein said cam means is attached to an elongated shaft slidably and rotatably mounted in said frame and wherein said release solenoid means is connected to said elongated shaft.

5. The indexing table advance means in accordance with claim 1 wherein a carriage shaft means is mounted on said frame across the forward end thereof and parallel to normal movement of said indexing table, wherein a carriage is slidably mounted on said carriage shaft means, wherein one end of said negator spring means is connected to said carriage, and wherein said carriage engages said slide means.

6. The indexing table advance means in accordance with claim 1 wherein said cam means is attached to an elongated shaft slidably and rotatably mounted on said frame, and wherein said spaced, substantially parallel detent faces on said cam means are parallel to the longitudinal axis of said elongated shaft.

7. In an electrically actuated nameplate marker having a frame, a marking ram means in said frame for substantially vertical travel, an indexing table slidably mounted on said frame for supporting a workpiece to be marked below said marking ram means, and electric motor means driving said marking ram means, an improved indexing table advance means which comprises: slide means on said frame, supporting said indexing table and provided with a rack means; pinion means rotatably mounted on said frame and engaging said rack means; escapement wheel means integral with said pinion means; cam means having a pair of spaced substantially parallel detent faces for alternate engagement with a tooth on said escapement wheel means; spacing solenoid means linked to said cam means for axially shifting said cam means so as to alternately engage said detent faces with a tooth on said escapement wheel; release solenoid means linked to said cam means for pivoting said cam means so as to move both of said detent faces out of engagement with said escapement wheel; and negator spring means mounted on said frame and associated with said slide means for applying a substantially constant pull on said slide means and urging a tooth on said escapement wheel against one of said detent faces.

* * * * *